United States Patent
Kanodia et al.

(10) Patent No.: US 6,243,757 B1
(45) Date of Patent: Jun. 5, 2001

(54) AUTOMATED INFORMATION FILTERING AND DISTRIBUTION SYSTEM

(75) Inventors: Rajendra Kumar Kanodia, Palo Alto; Steven Todd Black, Menlo Park, both of CA (US)

(73) Assignee: eNuntio, Inc., San Jose, CA (US)

(*) Notice: Subject to any disclaimer, the term of this patent is extended or adjusted under 35 U.S.C. 154(b) by 0 days.

(21) Appl. No.: 09/229,393

(22) Filed: Jan. 11, 1999

(51) Int. Cl.$^7$ .................................................... G06F 15/16

(52) U.S. Cl. ...................... 709/235; 709/217; 709/225; 709/229

(58) Field of Search ................................... 709/203, 217, 709/219, 218, 225, 226, 229, 235

(56) References Cited

U.S. PATENT DOCUMENTS

| | | | |
|---|---|---|---|
| 4,815,030 | 3/1989 | Cross et al. | 364/900 |
| 5,428,778 | * 6/1995 | Brookes | 707/5 |
| 5,535,382 | 7/1996 | Ogawa | 395/600 |
| 5,537,586 | 7/1996 | Amram et al. | 395/600 |
| 5,606,693 | 2/1997 | Nilsen et al. | 395/610 |
| 5,634,053 | 5/1997 | Noble et al. | 395/604 |
| 5,657,461 | 8/1997 | Harkins et al. | 395/333 |
| 5,689,642 | 11/1997 | Harkins et al. | 395/200.04 |
| 5,740,421 | 4/1998 | Palmon | 395/604 |
| 5,740,549 | * 4/1998 | Reilly et al. | 705/14 |
| 5,752,246 | * 5/1998 | Rogers et al. | 707/10 |
| 5,754,938 | * 5/1998 | Herz et al. | 455/4.2 |
| 5,768,528 | 6/1998 | Stumm | 395/200.61 |
| 5,790,790 | * 8/1998 | Smith et al. | 709/206 |
| 5,855,020 | 12/1998 | Kirsch | 707/10 |
| 5,862,325 | 1/1999 | Reed et al. | 395/200.31 |
| 5,867,667 | 2/1999 | Butman et al. | 395/200.79 |
| 5,867,799 | 2/1999 | Lang et al. | 707/1 |
| 6,026,369 | * 2/2000 | Capek | 705/14 |
| 6,047,327 | * 4/2000 | Tso et al. | 709/232 |

OTHER PUBLICATIONS

Malan, et al., "Salamander: A Push–based Distribution Substrate For Internet Applications", USENIX Symposium on Internet Technologies and Systems, pp. 171–181, Dec. 8–11, 1997 (1997).

Yan, et al., "Sift—A Tool for Wide–Area Information Dessemination", USENIX Technical Conference—Jan. 16–20, 1995, pp. 177–186 (1995).

Cooperstock, et al., "Why Use a Fishing Line When You Have a Net? An Adaptive Multicast Data Distibution Protocal", 1996 USENIX Technical Conference—Jan. 22–26, 1996—San Diego, CA, pp. 343–352 (1996).

(List continued on next page.)

*Primary Examiner*—Saleh Najjar
(74) *Attorney, Agent, or Firm*—Skjerven Morrill MacPherson LLP.; Fabio E. Marino

(57) ABSTRACT

An efficient and scalable real-time information distribution system and method of operation thereof are provided that build customized information collections according to individual preferences. This distribution system uses an information distribution network such as the Internet for its communications infrastructure. The system of the present invention is able to achieve high scalability and efficiency by routing information through the information distribution network. Information streams enter the information distribution network through feed processors. Feed processors, in turn, parse the information received from feed sources and create a set of "keyples." The keyples are then passed on to a series of keyple routers. The keyple routers match the keyples to a set of destinations, thus multiplexing the keyples to only those destinations that have requested the information. A destination can consist of either another keyple router (which allows for the information distribution network to scale to a massive number of destinations) or a keyple customizer. A keyple customizer assigns incoming keyples to collections and then passes them on to a collection builder. A collection builder, in turn, constructs custom keyple collections for individual users.

8 Claims, 13 Drawing Sheets

OTHER PUBLICATIONS

Manber, et al., "WebGlimpse—Combining Browsing and Searching", USENIX Association 1997 Annual Technical Conference, pp. 195–206, (1997).

Manber, et al., "The Search Broker", USENIX Association USENIX Symposium on Internet Technologies and Systems—Dec. 8–11, 1997, pp. 231–239 (1997).

Huang, et al., "A Bandwidth–Sensitive Update Scheduling Method for Internet Push", 18th International Conference on Distributed Computing Systems, IEEE Computer Society Technical Committee on Distributed Processing, May 26–29, 1998, pp. 303–310 (1998).

Tomasic, et al., "Scaling Heterogeneous Databases and the Design of Disco", Proceedings of the 16th International Conference of Distributed Computing Systems, May 27–30, 1996, IEEE Computer Society Press, pp. 449–457 (1996).

De Roure, et al., "A Distributed Hypermedia Link Service", Proceedings Third International Workshop on Services in Distributed and Networked Enviroments Jun. 3–4, 1996, IEEE Computer Society Technical Committee on Distributed Processing, pp. 156–161 (1996).

Kretser, et al., "Methodologies for Distributed Information Retrieval", Proceedings 18th International Conference on Distributed Computing Systems May 26–29, 1998, IEEE Computer Society Technical Committee on Distributed Processing, pp. 66–76 (1998).

Underwood, et al., "User–centered push for timely information delivery", Computer Networks and ISDN Systems 30, No. 1–7, pp. 33–40 (Apr. 1998).

Ardö, "A regional distributed WWW search and indexing service—the Desire way", Computer Networks and ISDN Systems, vol. 30, No. 1–7, pp. 173–183 (Apr. 1998).

Hartman, et al., "Index–based hyperlinks", Computer Networks and ISDN Systems, vol. 29, No. 8–13, pp. 1129–1135 (Sep. 1997).

Malan, et al., "Comparison of Two Middleware Data Dissemination Services in a Wide–Area Distributed System", Proceedings of the 17th International Conference on Distributed Computing Systems, IEEE Computer Society Press, pp. 411–419 (May 27–30, 1997).

Liu, et al., "A Dynamic Query Scheduling Framework for Distributed and Evolving Information Systems", Proceedings of the 17th International Conference on Distributed Computing Systems, IEEE Computer Society Press, pp. 474–481 (May 27–30, 1997).

* cited by examiner

AUTOMATED INFORMATION FILTERING AND DISTRIBUTION SYSTEM

CROSS-REFERENCE TO APPENDIX A

Appendix A, which is part of the present disclosure, contains a listing of segments of a computer program and related data, according to an embodiment of the invention. These listings of computer program contain material which is subject to copyright protection. The copyright owner has no objection to the facsimile reproduction by anyone of the patent document or the present disclosure, as it appears in the Patent and Trademark Office patent files or records, but otherwise reserves all copyright rights whatsoever.

BACKGROUND OF THE INVENTION

1. Field of the Invention

The present invention relates generally to information processing systems and, in particular, to information filtering and distribution systems.

2. Related Art

The Internet provides a forum for the distribution of information on a global basis. However, typically users are required to actively seek information either by specifying a given website or by performing a search of the information available on the world wide web. This model presumes that the user is already aware of the existence of the information. This model, therefore, does not provide a means for automatically distributing information to interested parties. To solve this problem several "push" technologies have been proposed by companies such as PointCast, BackWeb, and Marimba. These solutions store information in databases on servers, which are polled and queried for new information by the clients at periodic intervals. This architecture, however, has certain inherent disadvantages. First, the database-centric nature of the architecture limits system scalability because the database must repeatedly process user queries. Second, only limited customization of the information delivered to each user is provided since user queries must be kept brief and simple. Third, repeated polling results in a waste of communication bandwidth. Finally, because of delays introduced by the polling interval, these systems are not suitable for the delivery of time-sensitive information.

Email distribution has also been used to address this problem. However, while allowing for personalized information distribution, e-mail distribution of information does not provide fast distribution capability for time-sensitive delivery and dramatically increases the cost of distributing information over the Internet.

There is thus a need for a system for distributing information over the Internet that allows for both a high level of customization in the information distributed and timely delivery of time-sensitive information, without significantly impacting the cost of distributing information over the Internet.

SUMMARY OF THE INVENTION

The system and method of the present invention provide an efficient and scalable real-time information distribution system that builds customized information collections according to individual preferences. This distribution system uses an information distribution network such as the Internet for its communications infrastructure.

The system of the present invention is able to achieve high scalability and efficiency by routing information through the information distribution network. Information streams enter the information distribution network through feed processors. Feed processors, in turn, parse the information received from feed sources and create a set of "keyples." The keyples are then passed on to a series of keyple routers. The keyple routers match the keyples to a set of destinations, thus multiplexing the keyples to only those destinations that have requested the information. A destination can consist of either another keyple router (which allows for the information distribution network to scale to a massive number of destinations) or a keyple customizer. A keyple customizer assigns incoming keyples to collections and then passes them on to a collection builder. A collection builder, in turn, constructs custom keyple collections for individual users. Finally, users can connect to collection servers and examine their collections, which contain only the information requested by the users.

DETAILED DESCRIPTION OF THE INVENTION

Figure 1:
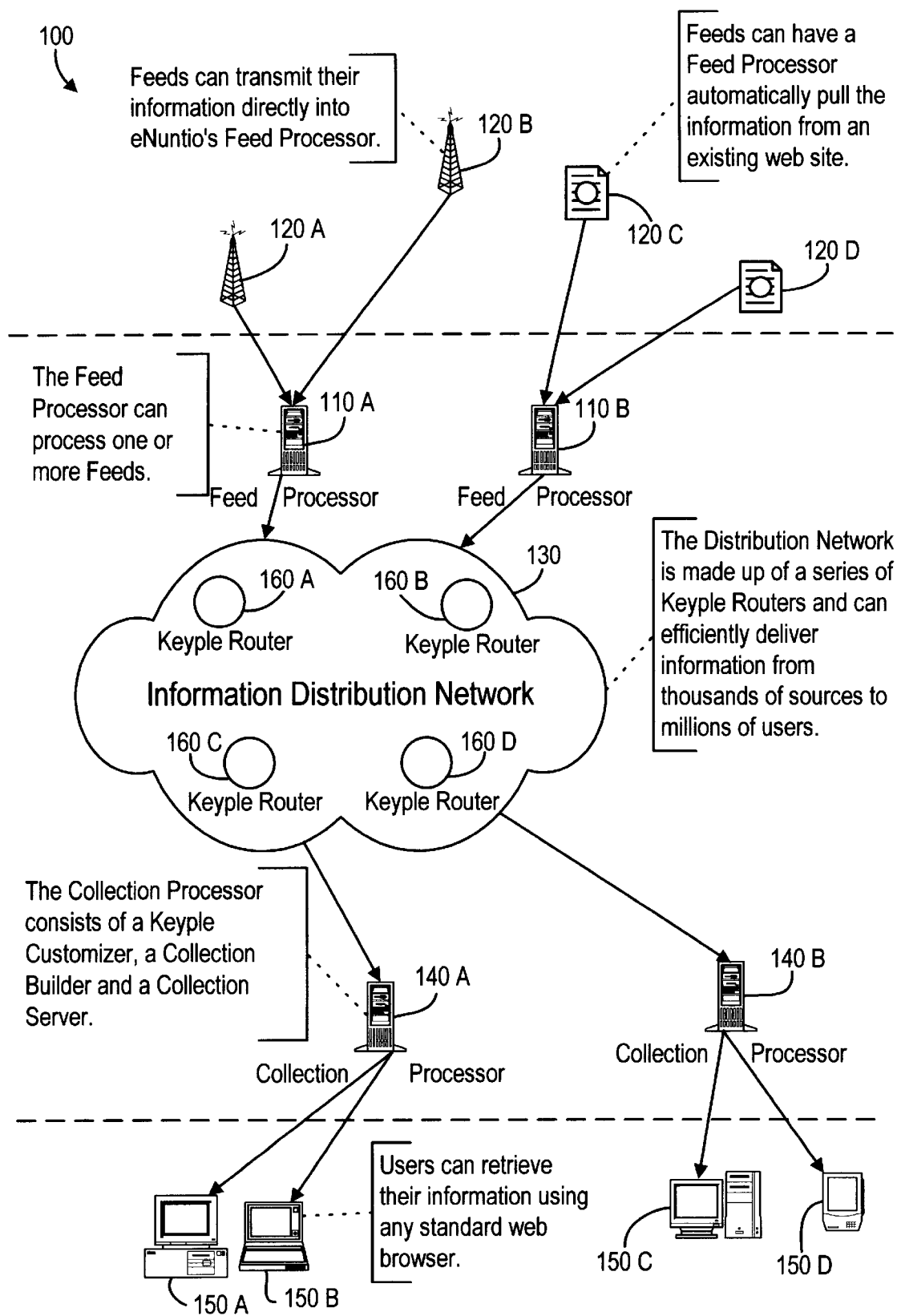
FIG. 1 is a block diagram of a system for filtering and distributing information, in accordance to an embodiment of the invention.

FIG. 1 is a block diagram of a system 100 for filtering and distributing information, in accordance to the present invention. System 100 includes feed processors 110*n* (where n=A, B, C, etc.) that receive messages from feed sources 120*n* (where n=A, B, C, etc.). Messages received from feed sources 120*n* may contain an abstract of the content represented by the message, a URL pointing back to a location in which the content is stored and one or more keywords (keys) describing the content. Feed processors 110*n*, in turn, either extract keys from the messages received from feed sources 120n or generate keys on-the-fly, when no keys are supplied from feed sources 120n. Feed sources 120n are any source of messages known in the art, such as news agencies, websites, stock brokerage companies, information services, etc. Messages, in turn, are any kind of structured or unstructured information suitable for mass distribution such as news, stock quotations, images, sound bytes, multimedia segments, etc.

The messages received from feed sources 120n are either stored on feed sources 120n or transmitted and cached on remotely located computers. In some embodiments, messages are delivered via satellite, RF transmission, network broadcast or other efficient mass distribution channel to servers located at Internet Service Providers (ISPs) sites. In other embodiments, the messages are stored on servers at a central location together with feed processors 110n.

Figure 2A:
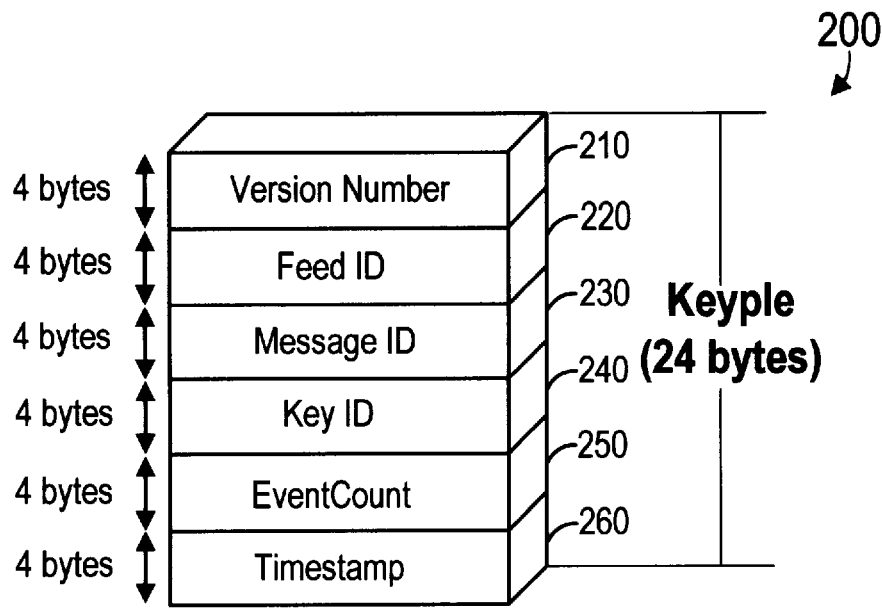
FIG. 2A is a block diagram of a keyple, in accordance to an embodiment of the invention.

Feed processors 110n, then, package the keys into keyples 200 (FIG. 2A). Keyples 200 are data sets that store information about keys. Each keyple 200 includes a version number 210, a feed ID 220, a message ID 230, a key ID 240, an event count 250 and a timestamp 260. In some embodiments, version number 210, feed ID 220, message ID 230, key ID 240, event count 250 and timestamp 260 require 4 bytes each, for a total of 24 bytes for an entire keyple 200. Since keyples 200 are dramatically reduced in size with respect to the messages (typical size 2048 bytes) they represent, the bandwidth required to transmit keyples 200 is substantially less than the one required to transmit the corresponding messages. As a result, mass distribution of keyples 200, unlike prior art "push" technologies, can be effected inexpensively over information distribution network 130.

Keyples 200 are then transmitted from feed processors 110n to collection processors 140n (where n=A, B, C, etc.) over information distribution network 130. Information distribution network 130, in turn, is made up by a series of keyple routers 160n (where n=A, B, C, etc.) connected via a computer network. Each keyple router 160n, in turn, receives keyples 200 and compares feed IDs 220 and key IDs 240 of each keyple 200 to feed ID/key ID pairs stored in a keyple router table 470 (FIG. 4B) to determine whether to route the keyple 200 to a destination specified by keyple router table 470. Destinations specified by keyple router table 470 can be either collection processors 140n or additional keyple routers 160n. Therefore, keyple routers 160n can be organized in a hierarchical structure to allow fast routing of massive amounts of keyples 200.

Figure 2B:
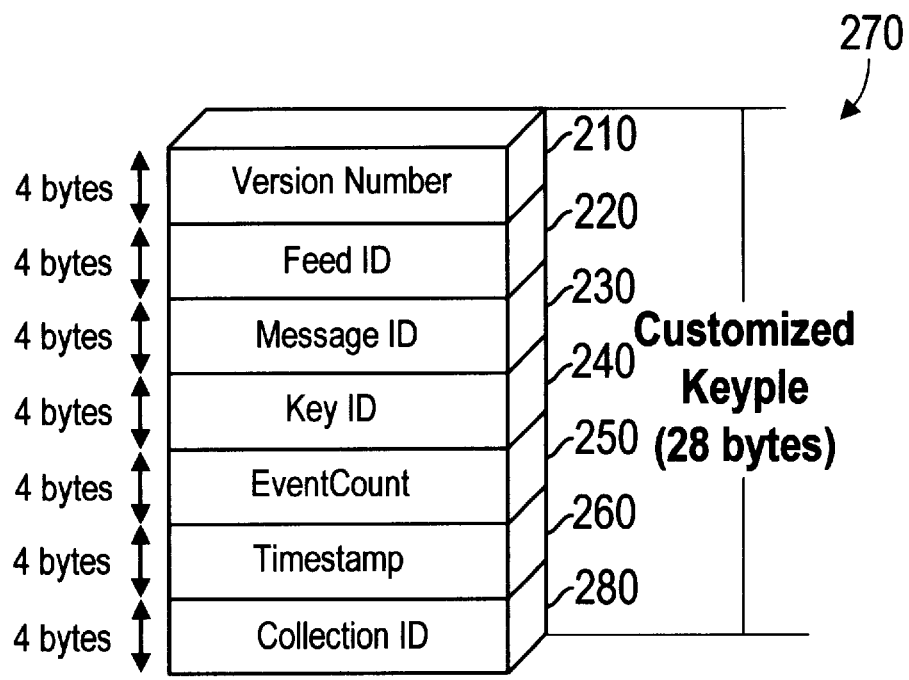
FIG. 2B is a block diagram of a customized keyple, in accordance to an embodiment of the invention.

If a match is found in keyple router table 470 to a destination corresponding to a collection processor 140n, the keyple 200 is routed to collection processor 140n. Collection processors 140n, in turn, receive keyples 200 and organize keyples 200 in customized keyple collections. Customized keyple collections are constructed in accordance to a set of preferences specified by users of system 100. The structure of a customized keyple 270 is shown in FIG. 2B. Customized keyple 270 is identical to keyple 200, except that a collection ID 280 is added.

Terminal computers 150n (where n=A, B, C, etc.) are connected to collection processors 140n either directly or through an ISP server. In the latter case, terminal computers 150n are connected to the ISP servers either through network connections or through dial-up modem connections. Users of terminal computers 150n can access the messages represented by their customized keyple collections by connecting to the collection processors 140n using a web browser program or other information retrieval technique known in the art. When the user connects to collection processor 140n, collection processor 140n extracts messages associated with customized keyples 280 and transmits customized keyples 280 to terminal computers 150n, where customized keyples 280 are displayed in the web browser window. The user can then retrieve the content associated with the message by selecting a hypertext link embedded in the message.

The content associated with the message is either retrieved directly from feed servers 120n or from an information cache on ISP servers. For example, in some embodiments the message contains a headline and a URL pointing to a location of the complete story which represents the content associated with the message. When the user follows the link associated with the headline, the URL contained in the message is used to retrieve the content from a remote location. The content is then displayed to the user together with other information extracted from the message (e.g., timestamp, feed source, abstract, etc.). In some instances (e.g. stock quotes), however, no content is associated with the message and therefore, only the information extracted from the message is presented to the user.

Feed processors 110n, collection processors 140n and keyple routers 160 are any suitable computers known in the art for receiving feeds over a computer network and extracting information keys from the feeds and distributing keys over an information distribution network. In some embodiments, feed processors 110n, collection processors 140n and keyple routers 160 are any Pentium® or PentiumII® based computers, available from a variety of third party manufacturers, G3 or Macintosh® computers, available from Apple Computer, Inc. of Cupertino, Calif., or high-end workstations such as UltraSparc™ workstations, available from Sun Microsystems, Inc. of Mountain View, Calif.

Furthermore, keyple routers 160n can be integrated with traditional network routers available from, for example, Cisco Systems, Inc. of San Jose, Calif. or 3COM Corporation of Santa Clara, Calif., that are part of information distribution network 130.

Figure 2C:
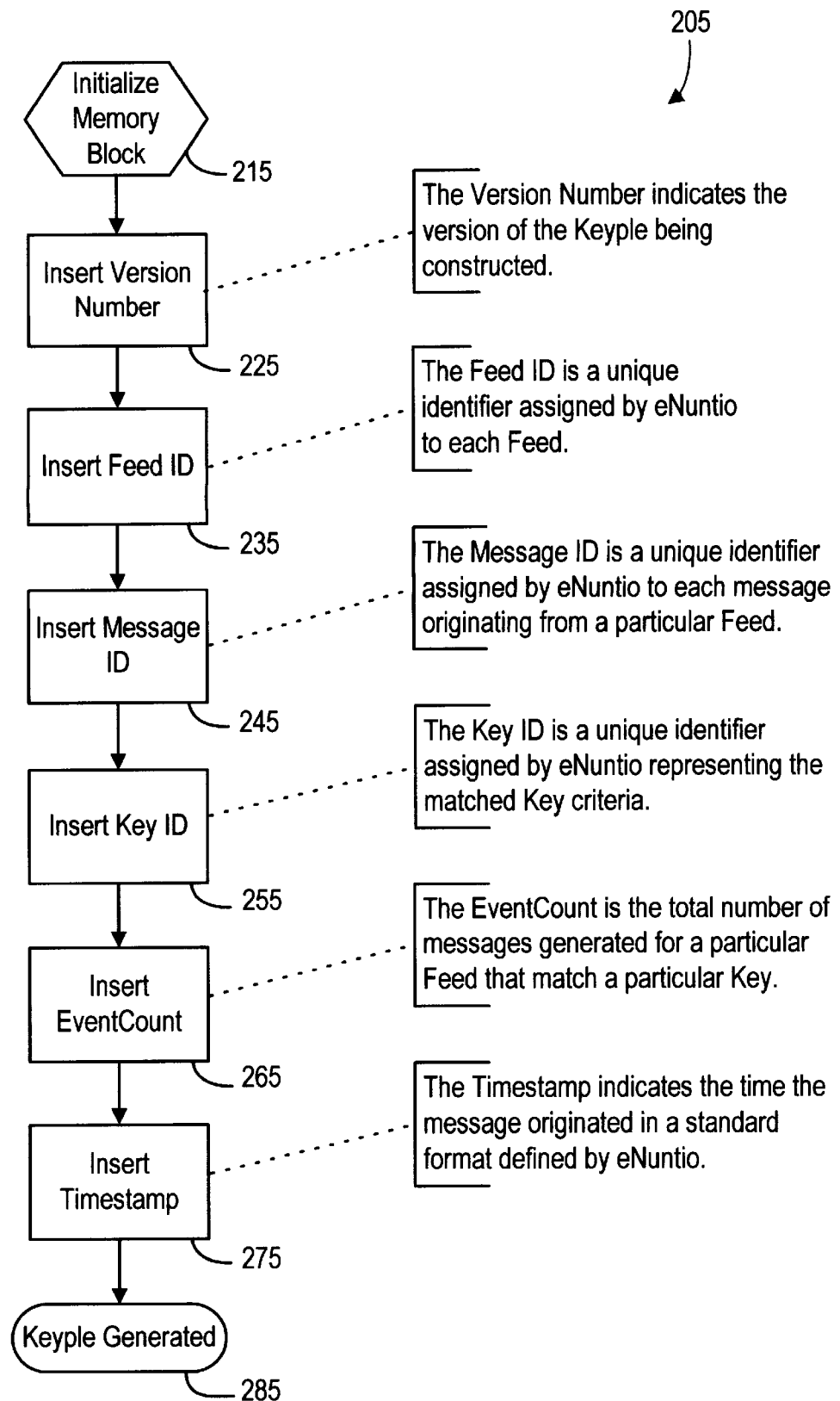
FIG. 2C is a flow diagram of a keyple creation operation, in accordance to an embodiment of the invention.

FIG. 2C is a flow diagram of a keyple creation operation 205 used to create keyple 200 on a feed processor 110n. In FIG. 2C, a block in a memory of feed processor 110n is first allocated to store keyple 200 in stage 215. In stage 225, version number 210 is inserted in the memory block allocated in stage 215. Version number 210 is generated in response to a change in the structure of keyple 200. In stage 235, feed ID 220 is inserted in the memory block allocated in stage 215. Feed ID 220 identifies the feed source 120n from which the message represented by keyple 200 is extracted. In stage 245, message ID 230 is inserted in the memory block allocated in stage 215. Message ID 230 is a unique identifier assigned by feed processor 110n to each message received by feed processor 120n. In stage 255, key ID 240 is inserted in the memory block allocated in stage 215. Key ID 240 is a unique ID obtained by searching key table 320 for each key extracted from the message received from feed source 120n. Key ID 240 need not be unique across keys extracted from different feed sources 120n. However, each combination of key ID 240 and feed ID 220 must be unique. Since multiple keys can be extracted from a single message received from feed source 120n, more than one keyple 200 may be generated for each message.

In stage 265, event count 250 is inserted in the memory block allocated in stage 215. Event count 250 is a numerical value assigned by feed processor 120n representing the number of messages received from a particular feed source 120*n* that match key ID 240 of keyple 200. In stage 275, timestamp 260 is inserted in the memory block allocated in stage 215. Time stamp 260 is a value representing the time at which the message received from feed source 120*n* originated. Finally, keyple 200 is generated in stage 285. The order in which stages 225–275 of operation 205 are performed is purely illustrative in nature. In fact, stage 225–275 of operation 205 can be performed in any order, in accordance to the principles of the present invention.

Figure 3A:
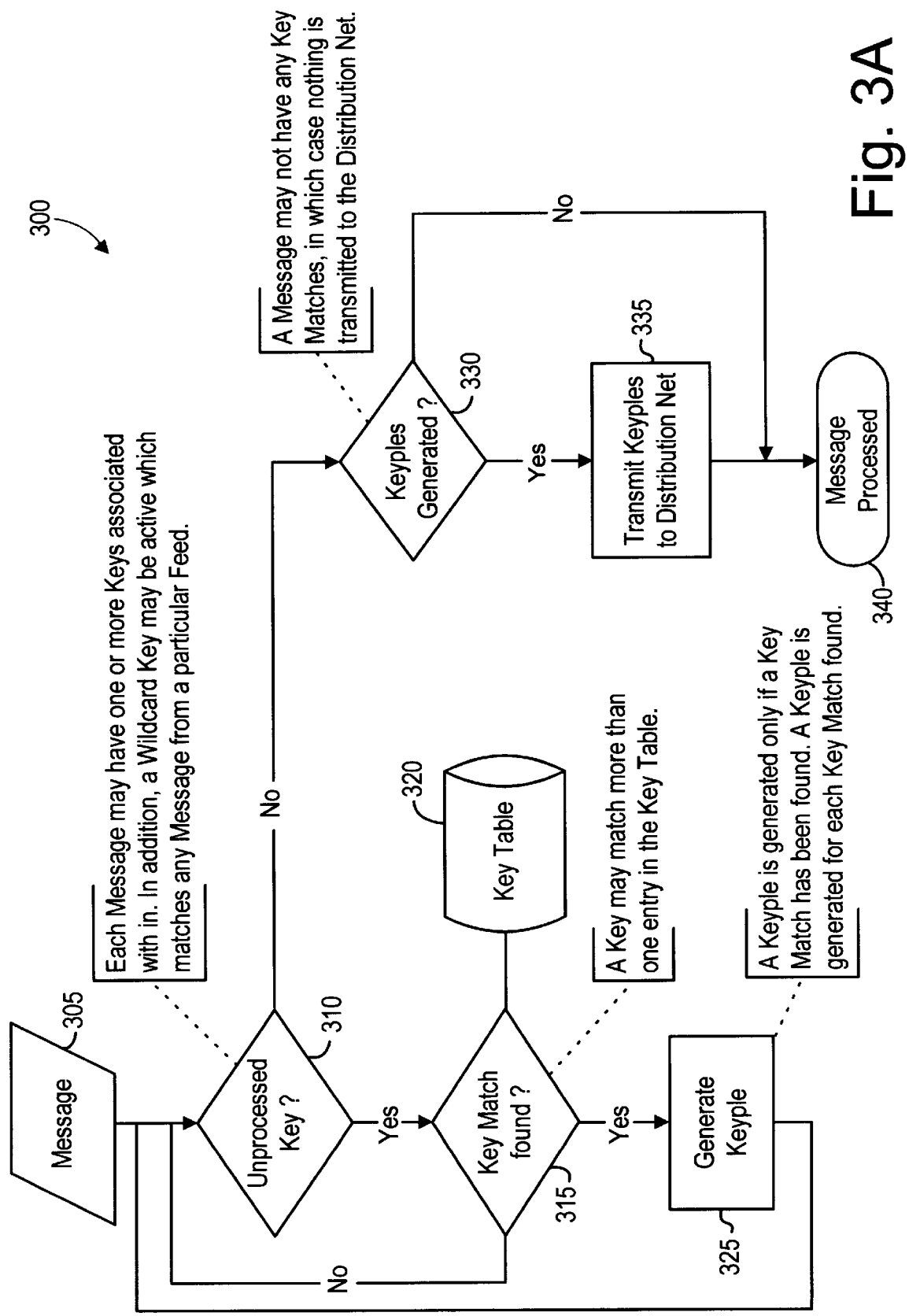
FIG. 3A is a flow diagram of the operation of a feed processor of FIG. 1.

FIG. 3A is a block diagram of a message processing operation 300 performed by a feed processor 110*n*. First, in stage 305, feed processor 110*n* receives a new message from a feed source 120*n*. Each message received by feed processor 110*n* may contain one or more keys associated with the message received from feed source 120*n*. Alternatively, a wildcard key may be used to match any message received from a particular feed source 120*n*. Stage 310 determines whether any of the keys received as part of the message are unprocessed, in which case operation 300 proceeds to stage 315. Otherwise, operation 300 proceeds to stage 330. Stage 315 determines whether a key match is found by comparing a key received from feed source 120*n* to the entries stored in key table 320. If a key match is found, operation 300 proceeds to stage 325. Otherwise, operation 300 reverts back to stage 310. If a key match is found, a keyple is generated in stage 325 and operation 300 reverts to stage 310. Thus, if multiple key matches are found for a message received from feed source 120*n*, multiple keyples 200 are generated. Stage 330, then determines whether any keyples were generated for the message received from feed source 120*n*, in which case operation 300 proceeds to stage 335. Otherwise, operation 300 proceeds to stage 340 and operation 300 terminates. Finally, keyples 200 generated in stage 325 are transmitted to a keyple router 160*n* over information distribution network 130 and operation 300 terminates.

Figure 3B:
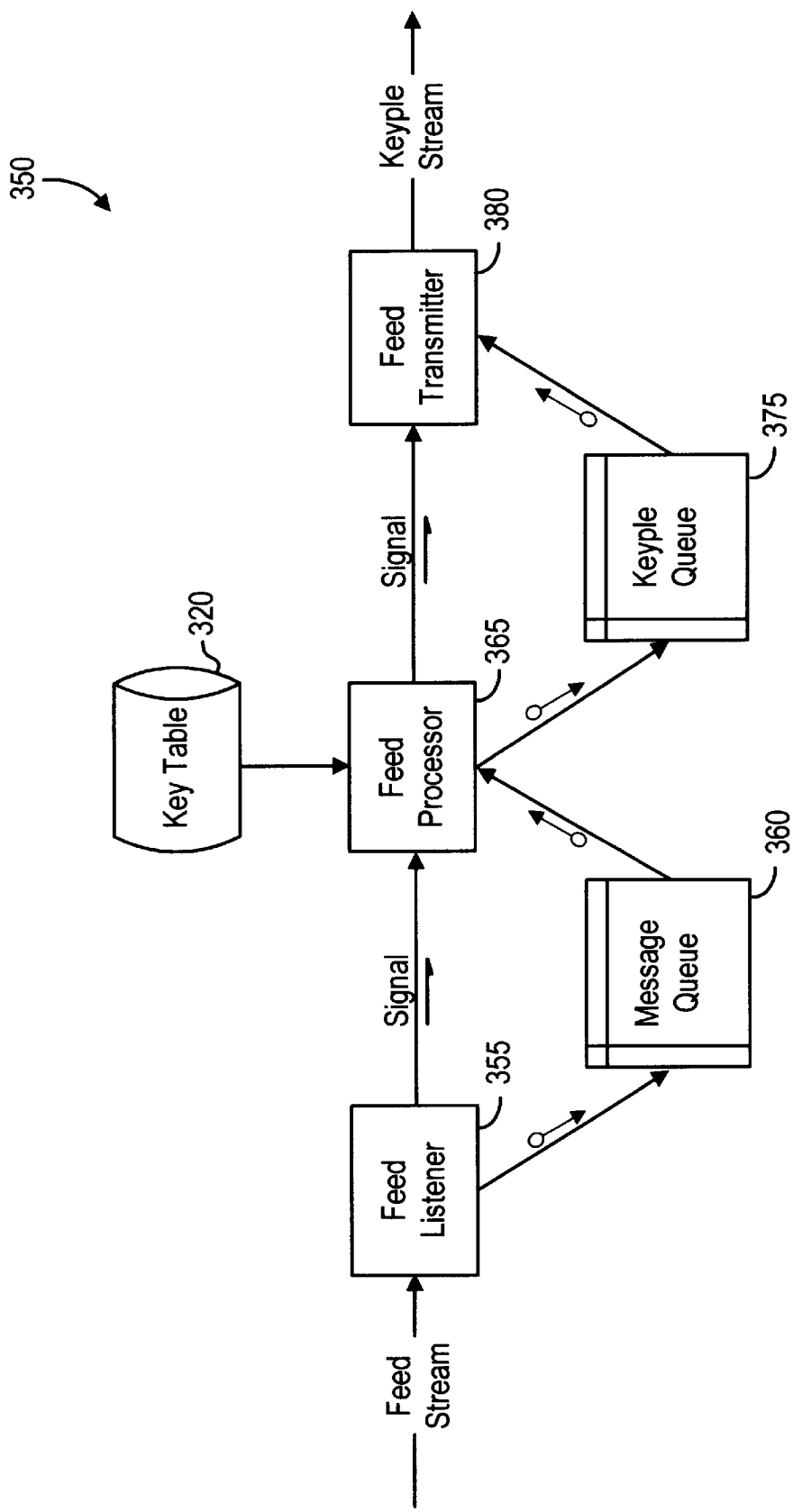
FIG. 3B is a data flow diagram of the operation of a feed processor of FIG. 1.

FIG. 3B illustrates data flow 350 through feed processor 110*n*. A feed stream received from feed source 120*n* is received by feed listener 355. Feed listener 355 extracts a message from the feed stream, stores the message in message queue 360 and signals to feed processor 365 that a new message has been received. Feed processor 365, in turn, extracts a message from message queue 360 and compares any keys contained in the message to the entries stored in key table 320. If any key matches are found, as explained with respect to the flow diagram of FIG. 3A, feed processor 365 adds a keyple 200 to keyple queue 375 and signals feed transmitter 380 that keyple 200 has been added to keyple queue 375. Finally, feed transmitter 380 periodically packages keyples 200 into keyple packets and transmits the keyple packets over information distribution network 130. Keyple packet transmissions are triggered either by having a sufficient number of keyples 200 to fill a keyple packet in keyple queue 375 or by expiration of a preset period of time in between keyple packet transmissions. However, some keyples, known as priority keyples, are immediately transmitted regardless of whether the keyple packet is filled. Thus, priority keyples can be used to transmit time sensitive information to ensure real time distribution of information.

In some embodiments, feed listener 355, feed processors 365 and feed transmitter 380 are separate threads of a C++ program executed by a Linux® (Red Hat v. 5.2) operating system running on feed processor 110*n*. Appendix A contains code segments illustrating possible implementations of feed listener 355, feed processor 365 and feed transmitter 380. Those skilled in the art, however, realize that feed listener 355, feed processor 365 and feed transmitter 380 could be implemented in computer languages other than C++ and executed by operating systems other than Linux®. For instance, feed listener 355, feed processor 365 and feed transmitter 380 could be implemented as JAVA™ bytecodes executed by any multi-threading operating system, such as versions of Unix® other than Linux®, Mac®OS, available from Apple Computer, Inc. of Cupertino, Calif., or Windows NT® 4.0, available from Microsoft Corp. Of Redmond, Wash.

Figure 4A:
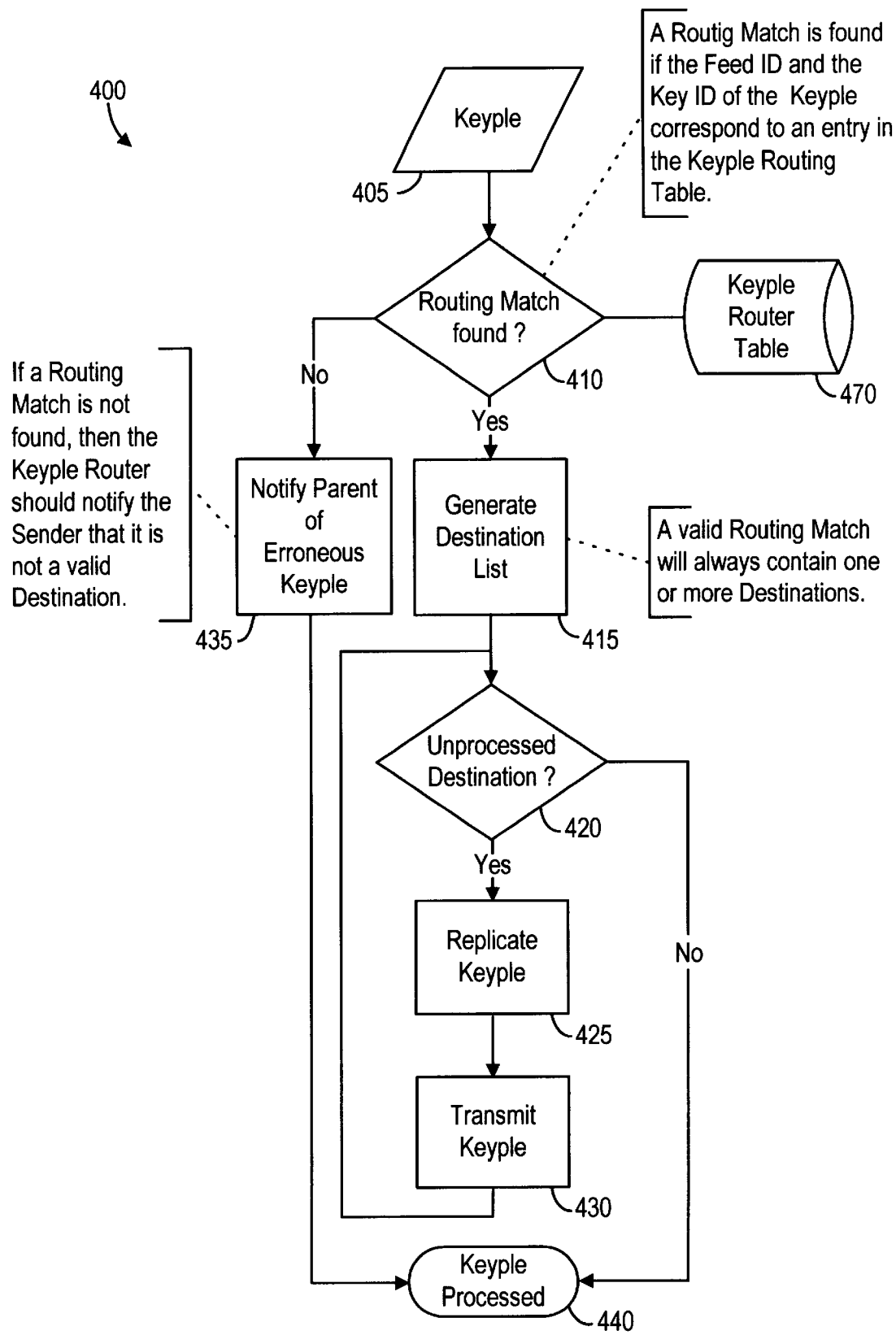
FIG. 4A is a flow diagram of the operation of a keyple router of FIG. 1.

FIG. 4A is a flow diagram of operation 400 executed by a keyple router 160*n* of FIG. 1. Initially, a keyple 200 is received by keyple router 160*n* over information distribution network 130 in stage 405. Stage 410 then determines whether a routing match is found by comparing feed ID 220 and key ID 240 of keyple 200 to the feed ID/key ID pairs stored in keyple router table 470. If a routing match is found, operation 400 proceeds to stage 415. Otherwise, keyple router 160*n* notifies the sender of keyple 200 that no routing match has been found in stage 435. Thus, keyple processing is completed in stage 440 and operation 400 terminates. If a routing match is found, a destination list is generated in stage 415. Thus, more than one destination can be specified for each routing match. Stage 420 determines whether a copy of keyple 200 has been sent to all destinations in the destination list generated in stage 415, in which case keyple processing is completed in stage 440 and operation 400 terminates. Otherwise, a copy of keyple 200 is generated in stage 425 and the copy of keyple 200 is transmitted to a new destination in stage 430. Stages 420–430 are then repeated until all destinations in the destination list have been processed. Keyple processing is completed in stage 440 and operation 400 terminates.

Figure 4B:
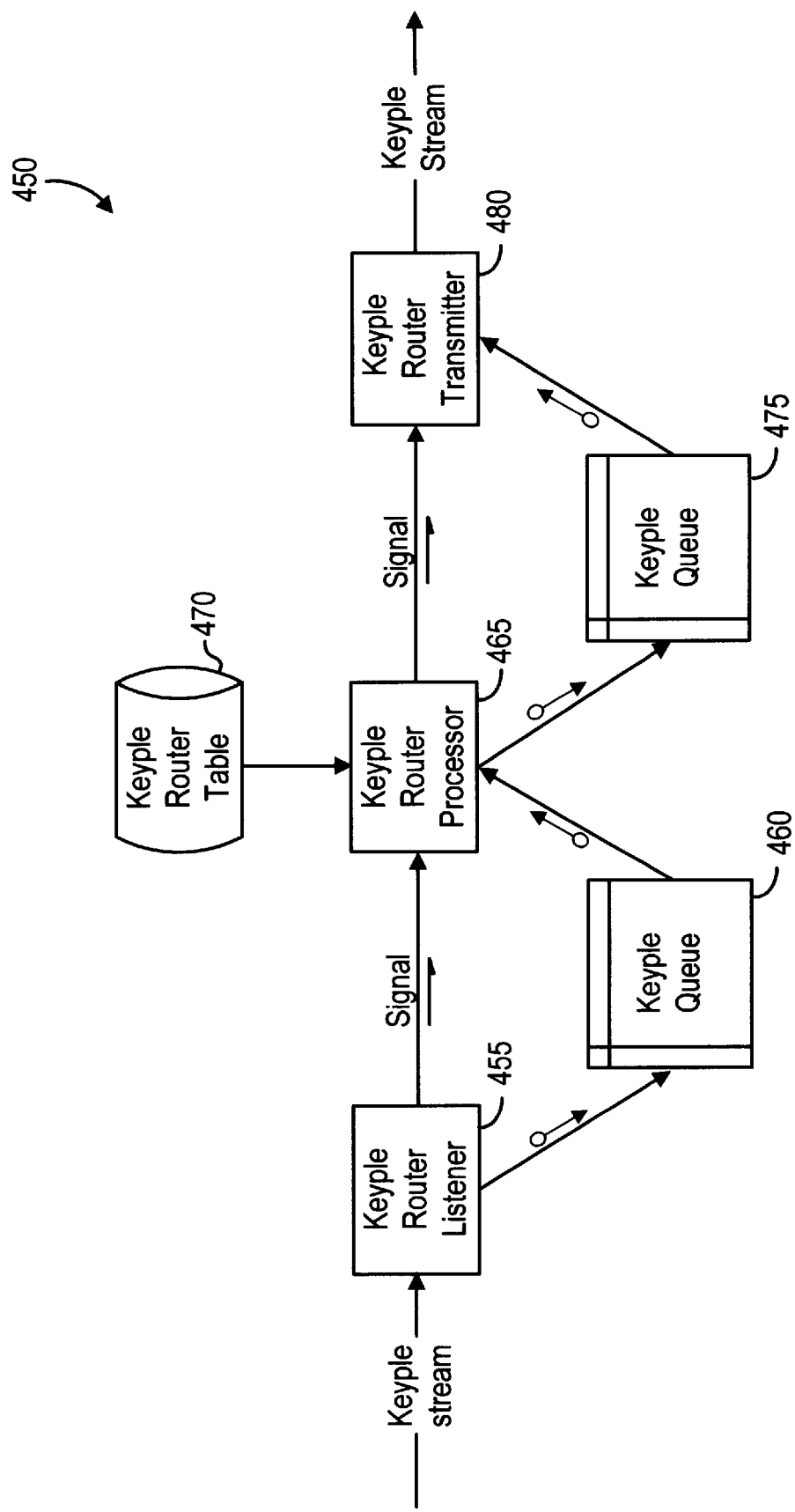
FIG. 4B is a data flow diagram of the operation of a keyple router of FIG. 1.

FIG. 4B illustrates data flow 450 through keyple router 160*n*. A keyple stream transmitted over information distribution network 130 is received by keyple router listener 455. Keyple router listener 455 extracts a keyple 200 from the keyple stream, stores keyple 200 in keyple queue 460 and signals to keyple router processor 465 that a keyple 200 has been received. Keyple router processor 465, in turn, extracts a keyple 200 from keyple queue 460 and compares feed ID 220 and key ID 240 contained in keyple 200 to the entries stored in keyple router table 470. If any routing matches are found, as explained with respect to the flow diagram of FIG. 4A, keyple router processor 465 adds keyple 200 to keyple queue 475 and signals keyple router transmitter 480 that keyple 200 has been added to keyple queue 475. Finally, keyple router transmitter 480 periodically packages keyples 200 into keyple packets and transmits the keyple packets over information distribution network 130. Keyple packet transmissions are triggered either by having a sufficient number of keyples 200 directed to a same destination to fill a keyple packet in keyple queue 475 or by expiration of a preset period of time in between keyple packet transmissions to a destination. As explained with respect to FIG. 3B, priority keyples are transmitted immediately regardless of whether the keyple packet is full.

In some embodiments, keyple router listener 455, keyple router processor 465 and keyple router transmitter 480 are separate threads of a C++ program executed by a Linux® (Red Hat v. 5.2) operating system running on keyple router 160*n*. Appendix A contains code segments illustrating possible implementations of keyple router listener 455, keyple router processor 465 and keyple router transmitter 480. Those skilled in the art, however, realize that keyple router listener 455, keyple router processor 465 and keyple router transmitter 480 could be implemented in computer languages other than C++ and executed by operating systems other than Linux®. For instance, keyple router listener 455, keyple router processor 465 and keyple router transmitter 480 could be implemented as JAVA™ bytecodes executed by any multi-threading operating system, such as versions of Unix® other than Linux®, Mac®OS, available from Apple Computer, Inc. of Cupertino, Calif., or Windows NT® 4.0, available from Microsoft Corp. Of Redmond, Wash.

Figure 5A:
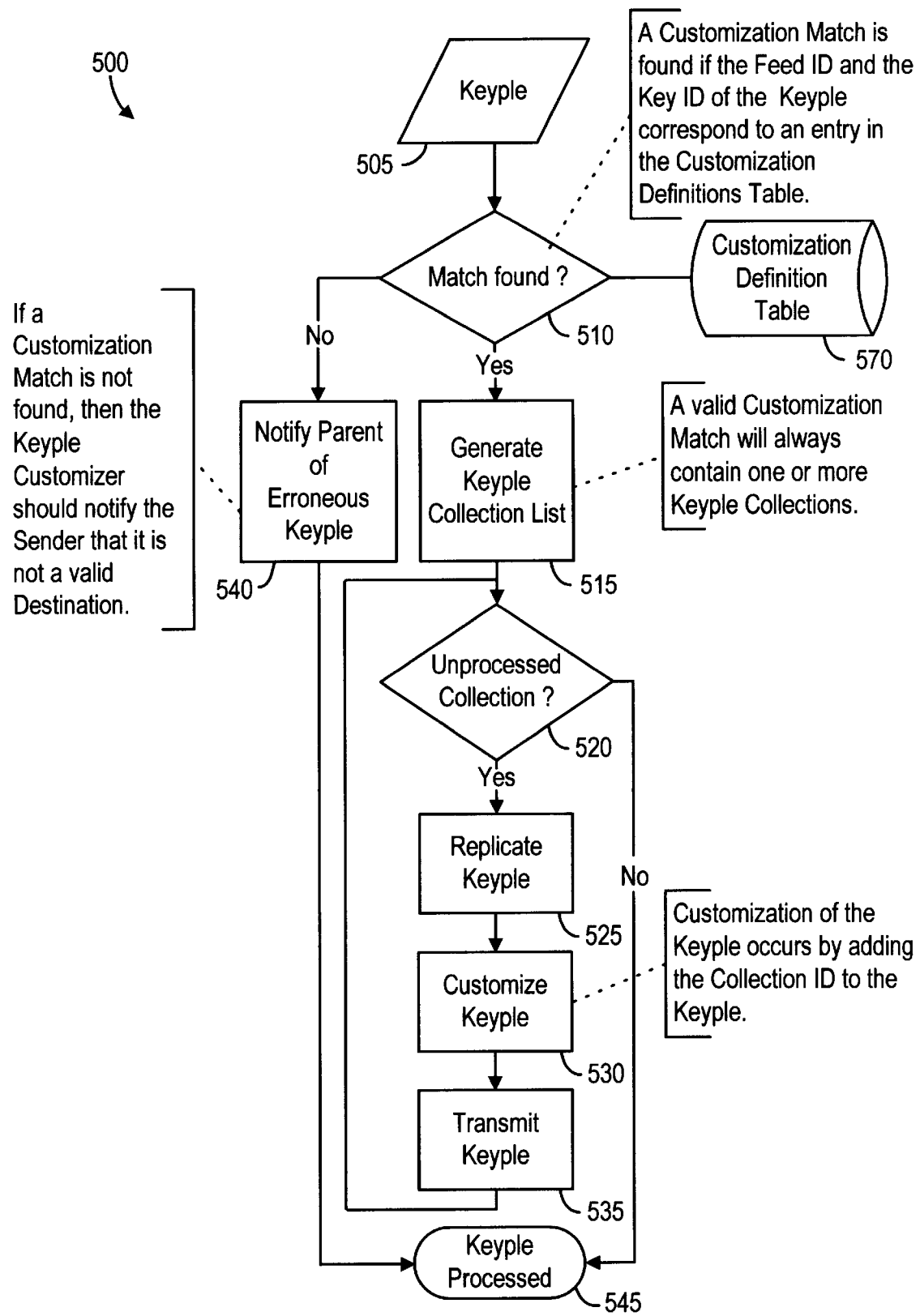
FIG. 5A is a flow diagram of the operation of a keyple customizer within a collection processor of FIG. 1.

FIG. 5A is a flow diagram of operation 500 executed by a keyple customizer of collection processor 140*n* of FIG. 1. Initially, a keyple 200 is received by collection processor 140*n* over information distribution network 130 in stage 505. Stage 510 then determines whether a customization match is found by comparing feed ID 220 and key ID 240 of keyple 200 to the feed ID/key ID pairs stored in customization definition table 570. If a customization match is found, operation 500 proceeds to stage 515. Otherwise, collection processor 140*n* notifies the sender of keyple 200 that no customization match has been found in stage 540. Thus, keyple processing is completed in stage 545 and operation 500 terminates. If a customization match is found, a keyple collection list is generated in stage 515. Thus, more than one keyple collection can be specified for each customization match. Stage 520 determines whether all keyple collections in the keyple collection list generated in stage 515 have been processed, in which case keyple processing is completed in stage 545 and operation 500 terminates. Otherwise, a copy of keyple 200 is generated in stage 525. A customized keyple 270 is then generated in stage 530 by inserting collection ID 280 into the copy of keyple 200 generated in stage 525. Customized keyple 270 is transmitted in stage 535. Stages 520–535 are then repeated until all keyple collections in the keyple collection list have been processed. Thus, keyple processing is completed in stage 545 and operation 500 terminates.

Figure 5B:
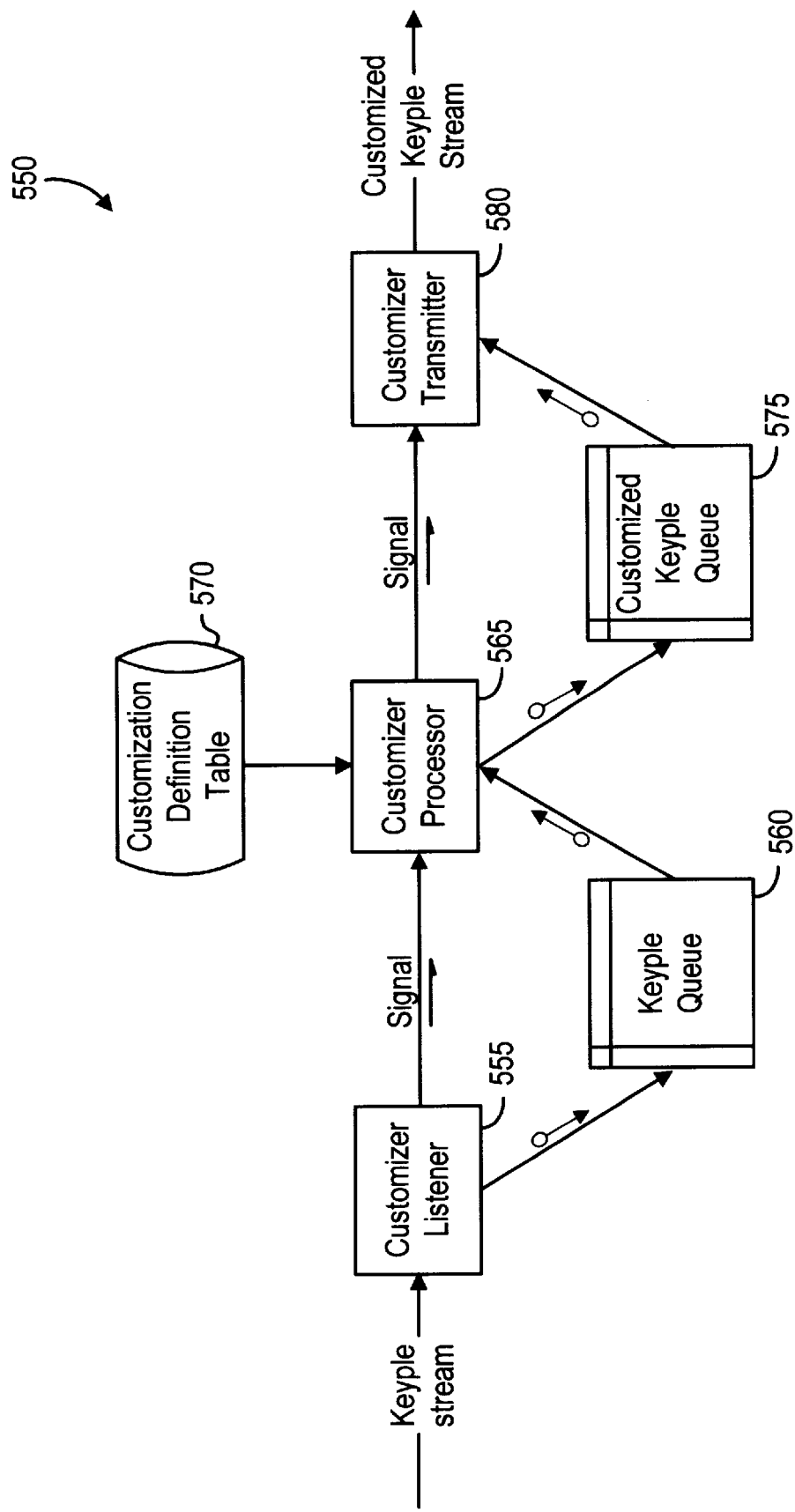
FIG. 5B is a data flow diagram of the operation of a keyple customizer within a collection processor of FIG. 1.

FIG. 5B illustrates data flow 550 through a keyple customizer of collection processor 140*n*. A keyple stream transmitted over information distribution network 130 is received by customizer listener 555. Customizer listener 555 extracts a keyple 200 from the keyple stream, stores keyple 200 in keyple queue 560 and signals to customizer processor 565 that a keyple 200 has been received. Customizer processor 565, in turn, extracts a keyple 200 from keyple queue 560 and compares feed ID 220 and key ID 240 contained in keyple 200 to the entries stored in customization definition table 570. If any customization matches are found, as explained with respect to the flow diagram of FIG. 5A, customizer processor 565 adds customized keyple 270 to customized keyple queue 575 and signals customizer transmitter 580 that customized keyple 270 has been added to customized keyple queue 575. Finally, customizer transmitter 580 sends customized keyple 270 to a collection builder of collection processor 140*n*.

In some embodiments, customizer listener 555, customizer processor 565 and customizer transmitter 580 are separate threads of a C++ program executed by a Linux® (Red Hat v. 5.2) operating system running on collection processor 140*n*. Appendix A contains code segments illustrating possible implementations of customizer listener 555, customizer processor 565 and customizer transmitter 580. Those skilled in the art, however, realize that customizer listener 555, customizer processor 565 and customizer transmitter 580 could be implemented in computer languages other than C++ and executed by operating systems other than Linux®. For instance, customizer listener 555, customizer processor 565 and customizer transmitter 580 could be implemented as JAVA™ bytecodes executed by any multi-threading operating system, such as versions of Unix® other than Linux®, Mac®OS, available from Apple Computer, Inc. of Cupertino, Calif., or Windows NT® 4.0, available from Microsoft Corp. Of Redmond, Wash.

Figure 6A:
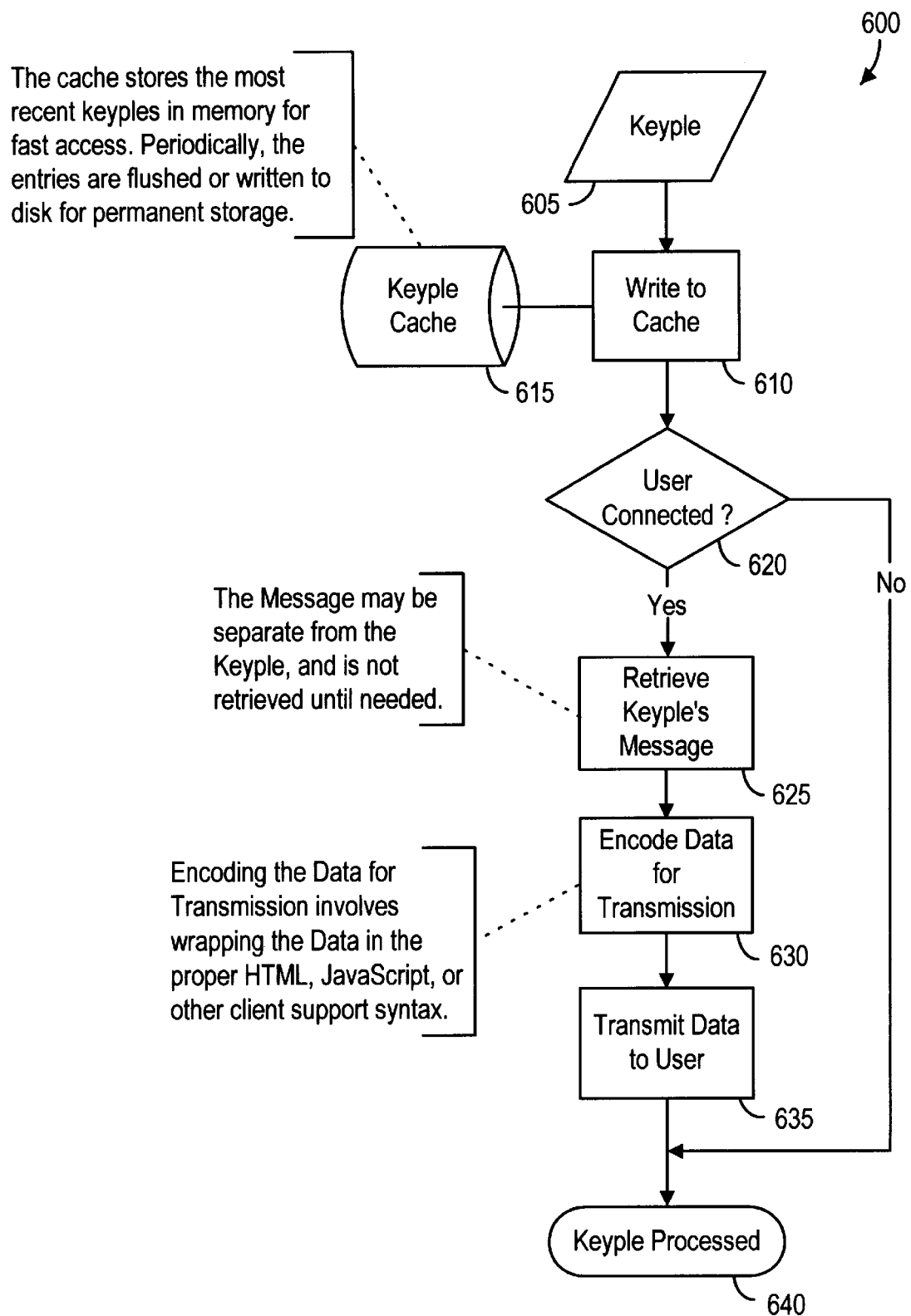
FIG. 6A is a flow diagram of the operation of a collection builder within a collection processor of FIG. 1.

FIG. 6A is a flow diagram of operation 600 of a collection builder of collection processor 140*n*. A customized keyple 270 transmitted from a keyple customizer of collection processor 140*n* is first received by the collection builder in stage 605. Customized keyple 270 is stored in keyple cache 615 in stage 610. Cache 615 stores the most recently received customized keyples 270 for fast access. Customized keyples 270 are periodically flushed from keyple cache 615 or written to disk for permanent storage. Stage 620 then determines whether a user of a terminal computer 150*n* is connected to collection processor 140*n*, in which case operation 600 proceeds to stage 625. Otherwise, keyple processing is completed in stage 640 and operation 600 terminates. A message associated with customized keyple 270 is then retrieved in stage 625. Information is extracted from the message retrieved in stage 625 and encoded for transmission to terminal computer 150*n* in stage 630. Depending on the type of connection between terminal computer 150*n* and collection server 140n the type of information extracted from the message and the formatting of the information may change. For instance, if the user of terminal computer 150*n* is accessing collection server 140*n* at an ISP site using a web browser over a dial-up connection, the information would be formatted as an HTML page. Alternatively, the information could also be formatted as JAVA™ bytecodes or other format supported by terminal computer 150*n*. Thus, keyple processing in completed in stage 640 and operation 600 terminates.

Figure 6B:
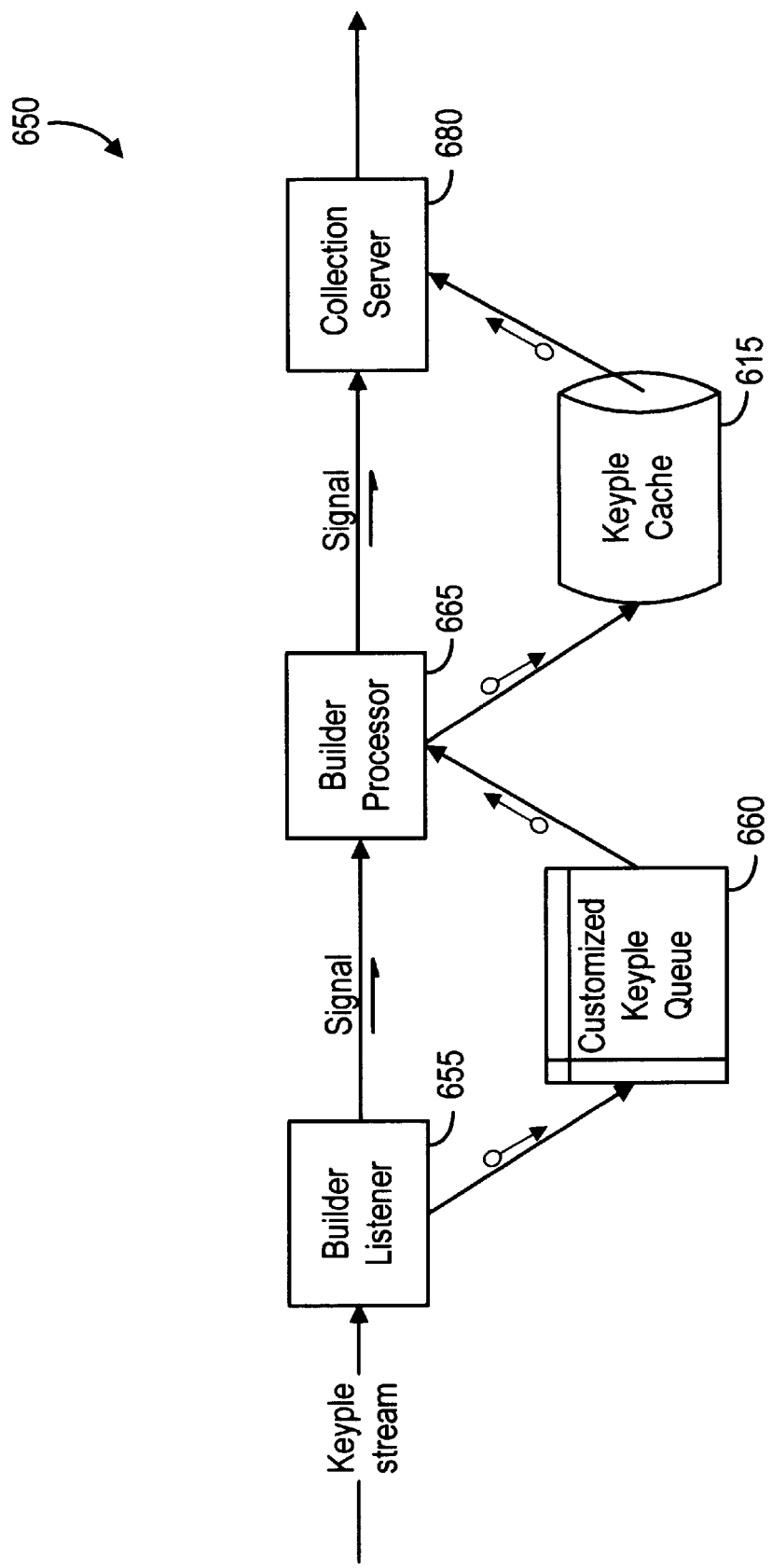
FIG. 6B is a data flow diagram of the operation of a collection builder within a collection processor of FIG. 1.

FIG. 6B illustrates data flow 650 through a collection builder of collection processor 140*n*. A customized keyple stream transmitted from a keyple customizer of collection processor 140*n* is received by builder listener 655. Builder listener 655 extracts a customized keyple 270 from the customized keyple stream, stores customized keyple 270 in customized keyple queue 660 and signals builder processor 665 that a customized keyple 270 has been received. Builder processor 665, in turn, extracts a customized keyple 270 from customized keyple queue 660, stores customized keyple 270 in keyple cache 615 and signals collection server 680 that customized keyple 270 has been added to keyple cache 615. Finally, collection server 680 processes customized keyple 270 as described with respect to the flow diagram of FIG. 6A.

In some embodiments, builder listener 655, builder processor 665 and collection processor 680 are separate threads of a C++ program executed by a Linux® (Red Hat v. 5.2) operating system running on collection processor 140*n*. Appendix A contains code segments illustrating possible implementations of builder listener 655 and builder processor 665. Those skilled in the art, however, realize that builder listener 655, builder processor 665 and collection processor 680 could be implemented in computer languages other than C++ and executed by operating systems other than Linux®. For instance, builder listener 655, builder processor 665 and collection processor 680 could be implemented as JAVA™ bytecodes executed by any multi-threading operating system, such as versions of Unix other than Linux®, Mac®OS, available from Apple Computer, Inc. of Cupertino, Calif., or Windows NT® 4.0, available from Microsoft Corp. Of Redmond, Wash.

Figure 7A:
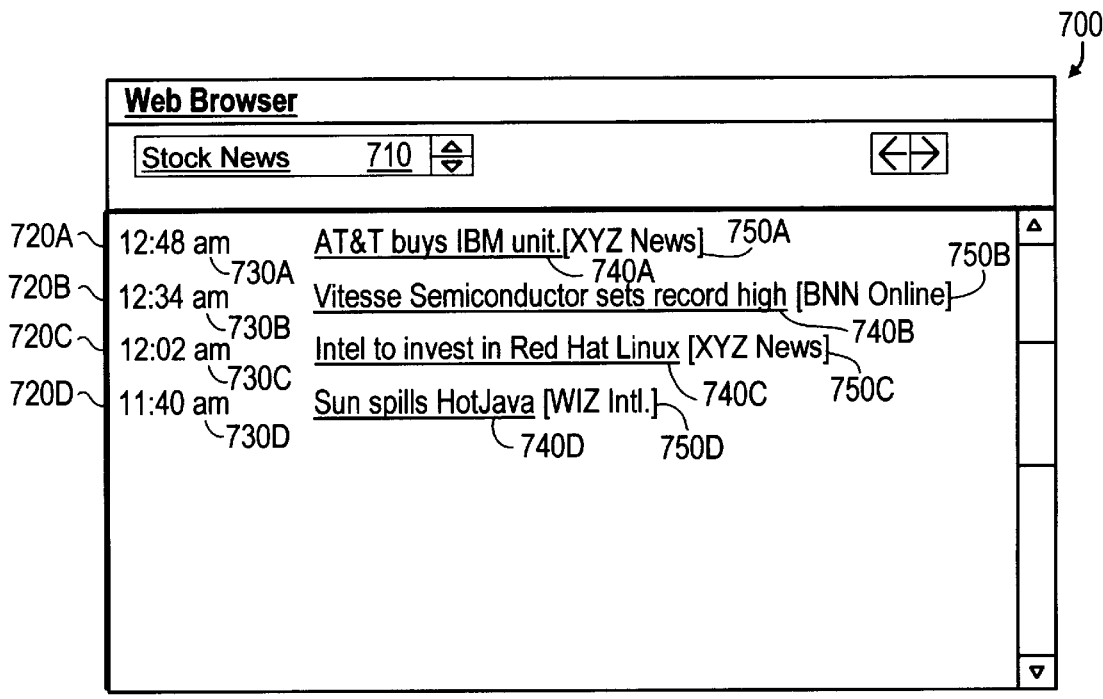
FIG. 7A is a diagram of a web browser window displayed on a screen of a terminal computer of FIG. 1.

FIG. 7A is a diagram of a web browser window 700 displayed on a screen of terminal computer 150*n*.. Web browser window 700 is a window displayed by any web browser program known in the art such as Internet Explorer 4.0, available from Microsoft Corporation of Redmond, Wash., or Netscape Navigator® 4.0, available from Netscape Communications, Corp. of Mountain View, Calif. Window 700 has a category selection menu 710 and multiple headlines 720$n$ (where n=A, B, C, etc.). Each headline 720$n$ has a timestamp 730n corresponding to timestamp 260 of customized keyple 270, hypertext link 740$n$ and feed source 750n. A user of terminal computer 150$n$ can retrieve the information associated with headline 720$n$ by clicking on hypertext link 730n, as shown in FIG. 7B.

Figure 7B:
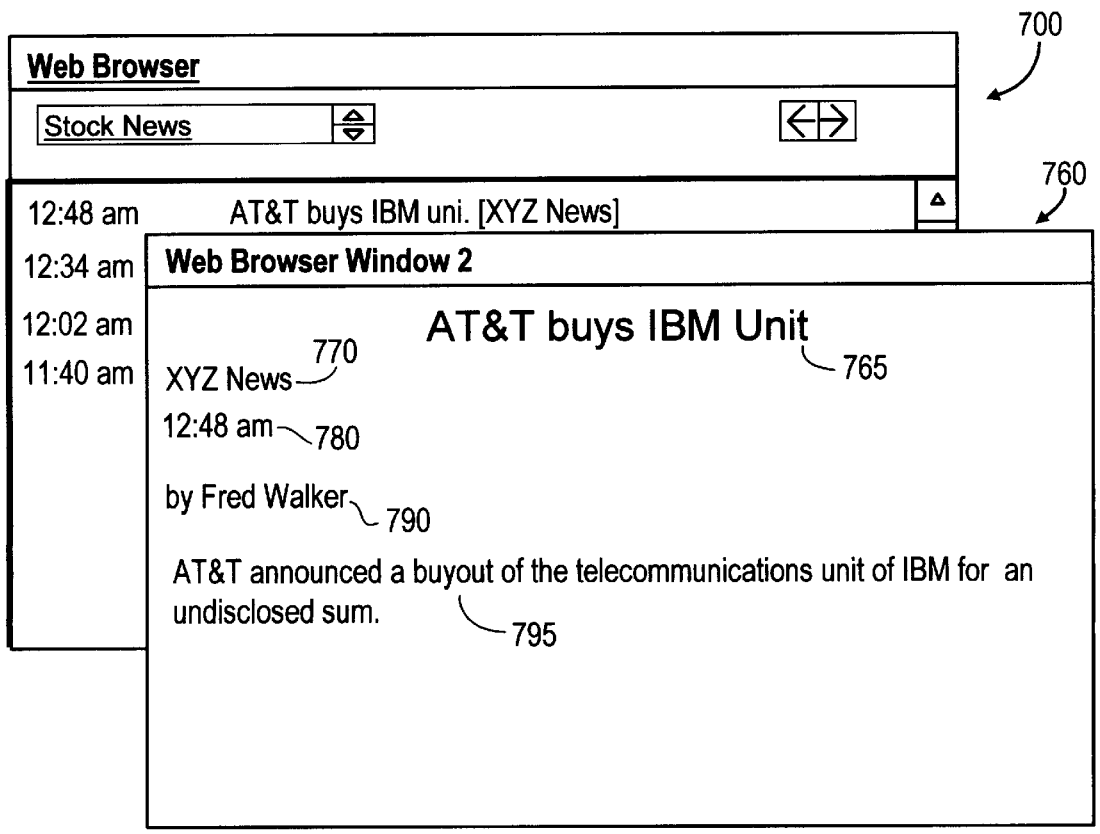
FIG. 7B is a diagram of a web browser window displayed on a screen of a terminal computer of FIG. 1 in response to a user selecting a hypertext link.

FIG. 7B is a diagram of a web browser window 760 displayed on a screen of terminal computer 150$n$ in response to a user selecting hypertext link 740A of FIG. 7A. Web browser window 760 is a window displayed by any web browser program known in the art such as Internet Explorer 4.0, available from Microsoft Corporation of Redmond, Wash., or Netscape Navigator® 4.0, available from Netscape Communications, Corp. of Mountain View, Calif. Web browser window 760 includes a title 765, a feed source 770, a timestamp 780, an author 790 and a body 795.

Figure 8:
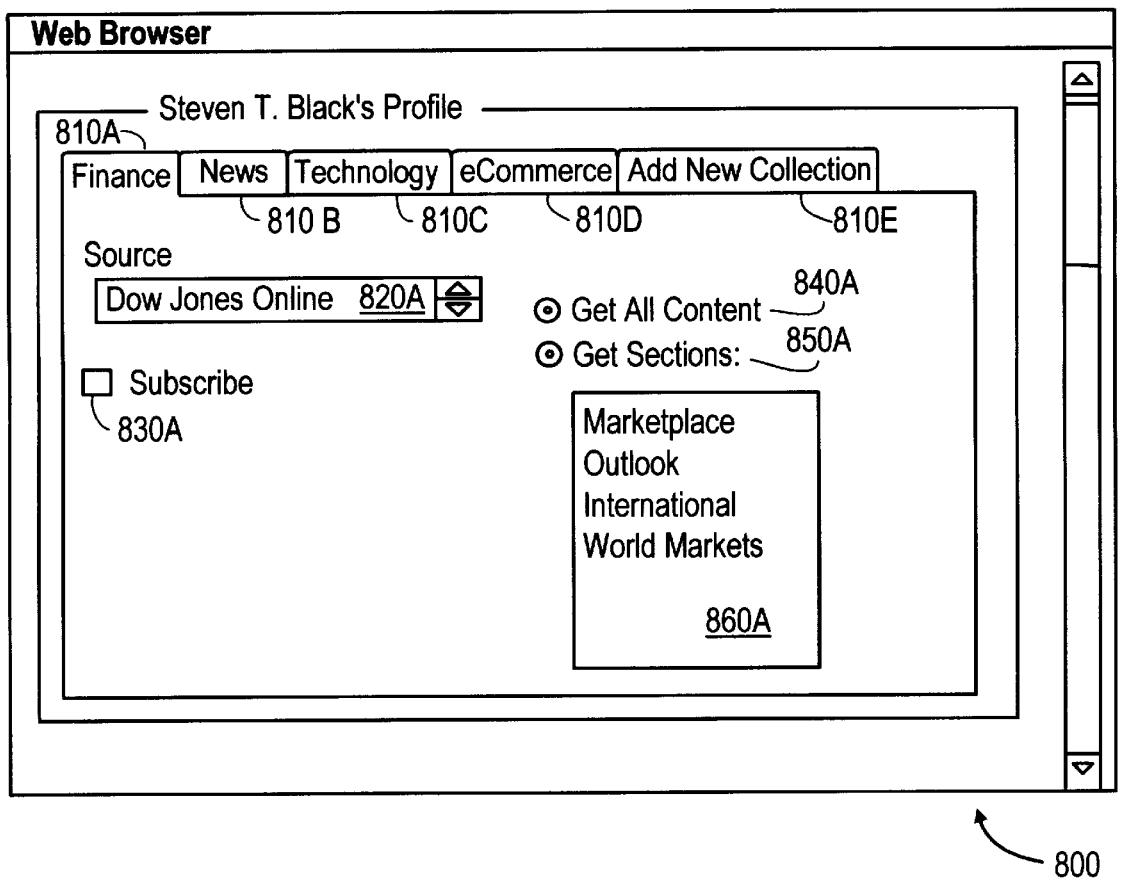
FIG. 8 shows a web browser window displayed on a screen of terminal computer of FIG. 1 to enable a user of the terminal computer to specify customization options.

FIG. 8 shows a web browser window 800 displayed on a screen of terminal computer 150$n$ to enable a user of terminal computer 150$n$ to specify customization options to be used by the keyple customizer of collection processor 140$n$. Web browser window 800 is a window displayed by any web browser program known in the art such as Internet Explorer 4.0, available from Microsoft Corporation of Redmond, Wash., or Netscape Navigator® 4.0, available from Netscape Communications, Corp. of Mountain View, Calif. Web browser 800 includes category tabs 810$n$ (where n=A, B, C, etc.). Each tab 810$n$ has a feed source menu 820$n$, a subscribe button 830$n$, a get all content button 840$n$, a get sections button 850$n$ and a sections list 860$n$. Windows NT is a registered trademark of Microsoft Corporation of Redmond, Wash. Pentium and Pentium II are registered trademarks of Intel Corporation of Santa Clara, Calif. Macintosh and MacOS are registered trademarks of Apple Computer, Inc. of Cupertino, Calif. UltraSparc and JAVA are trademarks of Sun Microsystems, Inc. of Mountain View, Calif. Unix is a registered trademark of American Telephone and Telegraph Company of New York, N.Y. Linux is a registered trademark of Linus Torvalds. Netscape Navigator is a registered trademarek of Netscape Communications, Corp. of Mountain View, Calif.

Embodiments described above illustrate but do not limit the invention. In particular, the invention is not limited to the particular hardware described herein. Those skilled in the art realize that alternative information delivery means can be employed in lieu of the ones described herein in accordance to the principles of the present invention. Furthermore, the invention is not limited to the distribution of any particular type of information. For example, the invention can be used to distribute news, advertisement, marketing materials, etc. Similarly, the invention is not limited to the particular web pages described herein. In fact, those skilled in the art realize that different web pages or even alternative information delivery techniques such as voice, paging, etc. may be used in lieu of the web pages of FIGS. 7A, 7B and 8. Other embodiments and variations are within the scope of the invention, as defined by the following claims.

Appendix A

```
/////////////////////////////////////////////////////////////////////
// FeedListener Thread Entry
/////////////////////////////////////////////////////////////////////
// This entry takes one primary signal: data_available.
// Note:  data_available indicates only that it is time to check for
// data, which may mean that either new data has arrived on a streamed
// connection, another process has signaled that it has generated fresh
// data, or if another poll of a data source is now required.  ReadData
// is a generic process that retrieves any data, by any of a number of
// mechanisms, and places it into a buffer.
// If a message is complete, then a new Message is created and a signal
// is sent to the FeedProcessor indicating a new message is available
// for processing in the Message Queue.
// CreateMessage packages the data in a standard format for easier
// processing by either placing any specified keywords into the Keyword
// List, or generating a set of keywords on the fly and placing them
// into the Keyword List.

entry (signal) {
   switch (signal) {
   case data_available:
      while (ReadData(buffer))  {
         if (MessageComplete(buffer)) {
            CreateMessage(buffer);
            FeedProcessor->Signal(message_available);
         }
      }
      break;

default:
      break;
   }
}
```

```
//////////////////////////////////////////////////////////////////
// FeedProcessor Thread Entry
//////////////////////////////////////////////////////////////////
// This entry takes one primary signal:  message_available.
// This signal is sent when a new message has been placed into the
// Message Queue by the FeedListener.
// The processor iterates through the keywords associated with the
// message and compares each keyword for a match in the KeyTable
// associated with the Feed. If a match is found, the Key is returned
// and a keyple is created.  If the message is a priority, a keyple is
// created in the priority queue and a signal is sent indicating a
// priority keyple is available.  For standard keyples, a keyple is
// created in the standard queue and the keyple_available signal is sent
// to the transmitter.
// Note: priority keyples and standard keyples are identical except for
// a flag indicating whether the keyple is priority or not.  The
// separate priority queues and signals allow priority keyples to be
// placed in an "express lane" for rapid delivery.

entry (signal) {
   switch (signal) {
   case message_available:
      while (GetMessage(message)) {
         while (GetKeyword(keyword)) {
            while ((key = KeyTable->FindMatch(keyword)) != NULL) {
               message->CreateKeyple(key);
               message->Signal(FeedTransmitter);
            }
         }
      }
      break;

default:
      break;
   }
}
```

```
///////////////////////////////////////////////////////////////////
// FeedTransmitter Thread Entry
///////////////////////////////////////////////////////////////////
// This entry takes three primary signals: keyple_available,
// priority_keyple_available, and idle_timeout. Normal case is
// keyple_available which is triggered when a new keyple is put into the
// Keyple Queue by the FeedProcessor. Idle Timeout ensures that keyples
// are not buffered too long for low-traffic feeds. In an effort to
// maximize network performance, the keyples are buffered into an
// appropriately sized packet buffer instead of directly transmitting each
// keyple independently. When the packet buffer is full, the entire
// packet is flushed out to the network. The idle timeout safeguards
// against data stalling in the packet buffering mechanism.
// For priority keyples, the keyples are all extracted and packetized,
// but the packet is flushed after all keyples are extracted regardless
// as to whether it is full or not.

entry (signal) {
   switch (signal) {
   case keyple_available:
      while (GetKeyple(keyple)) {
         packetBuffer->Add(keyple);
         if (packetBuffer->IsFull())
            packetBuffer->Flush();
      }
      break;

case priority_keyple_available:
      while (GetPriorityKeyple(keyple)) {
         priority_packetBuffer->Add(keyple);
         if (priority_packetBuffer->IsFull())
            priority_packetBuffer->Flush();
      }
      priority_packetBuffer->Flush();
      break;

case idle_timeout:
      if (!packetBuffer->IsEmpty())
         packetBuffer->Flush();
      break;

default:
      break;
   }
}
```

```
///////////////////////////////////////////////////////////////////
// RouterListner Thread Entry
///////////////////////////////////////////////////////////////////
// This Reads in data and extracts the keyples from the data stream.
// They keyple is then enqueued in the appropriate queue (priority or
// standard) and it then sends the appropriate signal (keyple_available
// or priority_keyple_available) to the RouterProcessor.

entry (signal) {
    switch (signal) {
    case data_available:
        while (ReadData(buffer)) {
            while ((keyple = GetNextKeyple(buffer)) != NULL) {
                keyple->Enqueue();
                keyple->Signal(RouterProcesor);
            }
        }
        break;

default:
        break;
    }
}
```

```
///////////////////////////////////////////////////////////////////
// RouterProcessor Thread Entry
///////////////////////////////////////////////////////////////////
// Processing is identical for both priority and standard keyples,
// except that standard processing gets it's keyples out of the standard
// queue, while priority gets them from the priority queue. The keyple
// contains the intelligence to replicate itself into the proper priority
// or standard queue for a particular destination, and can send the proper
// signal (keyple_available or priority_keyple_available) to the
// RouterTransmitter. The FindMatch of the RouterTable simply compares the
// FeedID and KeyID of the keyple against it's table of entries.  If a
// match is found, then a keyple is replicated and signal sent for each of
// the destinations associated with that match.

entry (signal) {
    switch (signal) {
    case keyple_available:
        while (GetKeyple(keyple)) {
            if ((destinationList=RouterTable->FindMatch(keyple)) != NULL) {
                for (i=0; i<destinationList->GetSize(); i++) {
                    keyple->Replicate(destination[i]);
                    keyple->Signal(RouterTransmitter);
                }
            }
        }
        break;

case priority_keyple_available:
        while (GetPriorityKeyple(keyple)) {
            if ((destinationList=RouterTable->FindMatch(keyple)) != NULL) {
                for (i=0; i<destionationList->GetSize(); i++) {
                    keyple->Replicate(destination[i]);
                    keyple->Signal(RouterTransmitter);
                }
            }
        }
        break;

default:
        break;
    }
}
```

```
474784    v1
```

```
/////////////////////////////////////////////////////////////////
// RouterTransmitter Thread Entry
/////////////////////////////////////////////////////////////////
// Processing is similar for both standard and priority keyples.  For
// standard keyples, the keyple is extracted from the KeypleQueue and
// added to a PacketBuffer.  If the packet buffer is full, it is then
// flushed out to the network.  For priority keyples, the keyple is
// extracted from the real-time KeypleQueue and added to the real-time
// packet buffer.  If there are no more priority keyples, then the
// packet is flushed to the net regardless as to whether it is full or
// not.  This helps to reduce latency for the priority keyples at the
// cost of some network efficiency.
// The idle-timeout signal makes sure that the standard keyples get
// flushed out to the network on a regular basis even if there is not
// much traffic.

entry (signal) {
    switch (signal) {
    case keyple_avialable:
        while (GetKeyple(keyple)) {
            packetBuffer->Add(keyple);
            if (packetBuffer->IsFull())
                packetBuffer->Flush();
        }
        break;

case priority_keyple_available:
        while (GetPriorityKeyple(keyple)) {
            priority_packetBuffer->Add(keyple);
            if (priority_packetBuffer->IsFull())
                priority_packetBuffer->Flush();
        }
        priority_packetBuffer->Flush();
        break;

case idle_timeout:
        if (!packetBuffer->IsEmpty())
            packetBuffer->Flush();

default:
        break;
    }
}
```

```
////////////////////////////////////////////////////////////////////
// CustomizerListener Thread Entry
////////////////////////////////////////////////////////////////////

// This reads in data from the routers and extracts the keyples from the
// data stream. The keyple is then enqueued in the appropriate queue
// (priority or standard) and a signal is sent to the
// CustomizerProcessor.

entry (signal) {
   switch (signal) {
   case data_available:
      while (ReadData(buffer)) {
         while ((keyple = GetNextKeyple(buffer)) != NULL) {
            keyple->Enqueue();
            keyple->Signal(CustomizerProcessor);
         }
      }
      break;

default:
      break;
   }
}
```

```
474784  v1

////////////////////////////////////////////////////////////////
// CustomizerProcessor Thread Entry
////////////////////////////////////////////////////////////////

// Processing is identical for both priority and standard keyples,
// except that standard keyples get extracted from the standard keyple
// queue, while priority keyples are extracted from the priority queue.
// Once a keyple has been extracted, a match is attempted against the
// preferences table.  The FindMatch of the PreferencesTable simply
// compares the FeedID and KeyID to determine if there is an entry in
// the table.  If so, then the keyple is Customized for each collection
// in the collectionList associated with that match.
// A Customized keyple begins by replicating the keyple and adds a
// CollectionID. A signal is then sent to the CustomizerTransmitter.
// CollectionIDs can indicate both personal collections and global
// collections.

entry (signal) {
   switch (signal) {
   case keyple_avialable:
      while (GetKeyple(keyple)) {
         if ((collectionList = PrefsTable->FindMatch(keyple)) !=
NULL) {
            for (i=0; i<collectionList->GetSize(); i++) {
               keyple->Customize(collectionList[i]);
               keyple->Signal(CustomizerTransmitter);
            }
         }
      }
      break;

case priority_keyple_available:
      while (GetPriorityKeyple(keyple)) {
         if ((collectionList = PrefsTable->FindMatch(keyple)) !=
NULL) {
            for (i=0; i<collectionList->GetSize(); i++) {
               keyple->Customize(collectionList[i]);
               keyple->Signal(CustomizerTransmitter);
            }
         }
      }
      break;

default:
      break;
   }
}
```

```
474784   v1
```

```
////////////////////////////////////////////////////////////////
// CustomizerTransmitter Thread Entry
////////////////////////////////////////////////////////////////

// The Transmitter is similar for both standard and priority keyples.
   // For standard keyples, the keyple is extracted from the standard
   // keyple queue and added to a PacketBuffer.  If the packet buffer is
   // full, it is then flushed out to the network.  For priority keyples,
   // the keyple is extracted from the priority queue and added to the
   // priority packet buffer. If the priority packet buffer is full, it is
   // flushed out to the net. However, if no more priority keyples are
   // available, the packet buffer is flushed regardless as to whether it
   // is full or not.  This reduces the latency for priority keyples at the
   // cost of some network efficiency. The idle-timeout signal makes sure
   // that the standard keyples get flushed out to the network on a regular
   // basis even if there is not much traffic.

entry (signal) {
      switch (signal) {
      case keyple_avialable:
         while (GetKeyple(keyple)) {
            packetBuffer->Add(keyple);
            if (packetBuffer->IsFull())
               packetBuffer->Flush();
         }
         break;

case priority_keyple_available:
         while (GetPriorityKeyple(keyple)) {
            priority_packetBuffer->Add(keyple);
            if (priority_packetBuffer->IsFull())
               priority_packetBuffer->Flush();
         }
         priority_packetBuffer->Flush();
         break;

case idle_timeout:
         if (!packetBuffer->IsEmpty())
            packetBuffer->Flush();
         break;

default:
         break;
      }
   }
```

```
//////////////////////////////////////////////////////////////////
// BuilderListener Thread Entry
//////////////////////////////////////////////////////////////////

// This reads in data from the Customizer and extracts the customized
// keyples from the data stream.  The keyple is then enqueued in the
// appropriate queue and a signal is sent to the BuilderProcessor.

entry (signal) {
    switch (signal) {
    case data_available:
        while (ReadData(buffer)) {
            while ((keyple = GetNextKeyple(buffer)) != NULL) {
                keyple->Enqueue();
                keyple->Signal(BuilderProcessor);
            }
        }
        break;

default:
        break;
    }
}

//////////////////////////////////////////////////////////////////
// BuilderProcessor Thread Entry
//////////////////////////////////////////////////////////////////

// This simply takes the customized keyples and writes them into the
// appropriate cache. There may be separate caches for priority and
// standard keyples.  A signal is sent to the CollectionServer to
// indicate a new piece of information is available.

entry (signal) {
    switch (signal) {
    case keyple_avialable:
    case priority_keyple_available:
        keyple->WriteToCache();
        keyple->Signal(CollectionServer);
        break;

default:
        break;
    }
}
```

We claim:

1. A system for filtering and distributing information, the system comprising:

a distribution network;

one or more feed processors connected to the information distribution network, wherein each feed processor receives messages from an external information source, extracts at least one key from each message and, for each key, generates a data set containing the key (keyple);

one or more collection processors connected to the information distribution network, wherein each collection processor receives keyples transmitted by one or more feed processors over the distribution network, and generates one or more keyple collections; and one or more computers connected to the collection processors, wherein each computer receives messages associated with one or more keyple collections generated by the collection processors, the feed processors package multiple keyples into keyple packets and transmit keyple packets over the information distribution network; and the information distribution network further comprises one or more keyple routers connected over the information distribution network, wherein each keyple router receives keyple packets from either a feed processor or another keyple router, extracts keyples from a keyple packet, and routes each keyple either to another keyple router or to a collection processor.

2. The system of claim 1, wherein each keyple router further replicates each keyple and routes each replicated keyple either to another keyple router or to a collection processor.

3. The system of claim 1, wherein the keyples are routed by extracting a feed/key pair from each keyple and comparing the feed/key pair to information stored in a routing table of the keyple router.

4. A method for filtering and distributing information, the method comprising:

one or more feed processors connected to an information distribution network receiving messages from an external information source, extracting at least one key from each message and generating a keyple for each key, wherein the keyple is a data set containing the key;

one or more collection processors connected to the information distribution network receiving keyples transmitted by one or more feed processors over the distribution network, and generating one or more keyple collections;

one or more computers connected to the collection processors receiving messages associated with one or more keyple collections generated by the collection processors; and the feed processors packaging multiple keyples into keyple packets and transmitting keyple packets over the information distribution network, wherein the information distribution network further comprises one or more keyple routers connected over the information distribution network, the method further comprising each keyple router receiving keyple packets from either a feed processor or another keyple router, extracting keyples from a keyple packet, and routing each keyple either to another keyple router or to a collection processor.

5. The method of claim 4, further comprising each keyple router replicating each keyple and routing each replicated keyple either to another keyple router or to a collection processor.

6. The method of claim 4, wherein routing the keyples further comprises extracting a feed/key pair from each keyple and comparing the feed/key pair to information stored in a routing table of the keyple router.

7. A computer data signal embodied in a carrier wave transmitted from a feed processor to a collection processor over an information distribution network, after the feed processor has received a message from a feed source, the signal comprising a keyple, the keyple comprising:

a feed/key pair;

a message ID;

an event count; and a time stamp, wherein the information distribution network further comprises one or more keyple routers connected over the information distribution network, the keyple routers routing keyples from the feed processors to the collection processors by comparing the feed/key pair of each keyple to information stored in a routing table of the keyple router.

8. The signal of claim 7, wherein each keyple router further replicates each keyple and routes each replicated keyple either to another keyple router or to a collection processor.

* * * * *